(12) United States Patent
Meyer et al.

(10) Patent No.: US 10,821,966 B2
(45) Date of Patent: Nov. 3, 2020

(54) HYBRID VEHICLE CONTROL SYSTEM

(71) Applicant: Ford Global Technologies, LLC, Dearborn, MI (US)

(72) Inventors: Jason Meyer, Canton, MI (US); Rajit Johri, Canton, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 508 days.

(21) Appl. No.: 15/809,716

(22) Filed: Nov. 10, 2017

(65) Prior Publication Data
US 2019/0143961 A1   May 16, 2019

(51) Int. Cl.
*B60W 20/40* (2016.01)
*B60K 6/26* (2007.10)
*B60W 10/02* (2006.01)
*B60W 10/08* (2006.01)
*B60W 20/10* (2016.01)
*B60K 6/387* (2007.10)

(52) U.S. Cl.
CPC ............... *B60W 20/40* (2013.01); *B60K 6/26* (2013.01); *B60K 6/387* (2013.01); *B60W 10/02* (2013.01); *B60W 10/08* (2013.01); *B60W 20/10* (2013.01); *B60K 2006/268* (2013.01); *B60Y 2200/92* (2013.01); *B60Y 2300/192* (2013.01); *B60Y 2300/421* (2013.01); *B60Y 2300/63* (2013.01); *B60Y 2400/47* (2013.01); *Y10S 903/906* (2013.01); *Y10S 903/914* (2013.01); *Y10S 903/93* (2013.01)

(58) Field of Classification Search
CPC ...... B60W 10/08; B60W 10/06; B60W 10/02; B60W 20/40; B60W 20/00; B60W 2710/083; B60W 10/026; B60W 20/10; B60W 20/30; B60W 10/10; B60W 2710/0666; B60W 30/19; B60W 2710/0644; B60W 2510/0638; B60W 2510/083; B60W 2710/1005; B60W 2510/1015; B60W 2710/021; B60W 2710/027; B60W 2510/1005; B60W 2710/024; B60W 2510/0657; B60W 2510/0233; B60W 2710/1011; B60W 2510/0208; B60W 2710/1022; B60W 2710/105; B60W 20/20; B60W 2710/028; B60W 30/188; B60W 50/06; B60W 2030/203; B60W 2510/0283
See application file for complete search history.

(56) References Cited

U.S. PATENT DOCUMENTS 9,067,587 B1   6/2015   Johri et al.
9,550,488 B1   1/2017   Johri et al.
(Continued)

*Primary Examiner* — Tuan C To
*Assistant Examiner* — Paul A Castro
(74) *Attorney, Agent, or Firm* — David B Kelley; Brooks Kushman P.C.

(57) ABSTRACT

A vehicle includes an engine, a motor, and a controller. The engine and motor are each configured to deliver torque to a torque converter impeller. The controller is programmed to, responsive to a demanded impeller torque exceeding an upper motor torque threshold while the motor alone is delivering torque to the impeller, increase motor torque to a value that is less than the threshold and that depends on a torque converter bypass clutch torque capacity and a torque converter turbine speed.

19 Claims, 4 Drawing Sheets

(56) References Cited

U.S. PATENT DOCUMENTS

| | | |
|---|---|---|
| 9,623,867 B2 | 4/2017 | Ashizawa et al. |
| 2003/0129457 A1* | 7/2003 | Kawai ................. H01M 10/488 429/7 |
| 2015/0065297 A1* | 3/2015 | Hoshiba ........... B60W 30/18118 477/19 |

* cited by examiner

HYBRID VEHICLE CONTROL SYSTEM

TECHNICAL FIELD

The present disclosure relates to control systems for hybrid vehicles that include multiple power generating devices for propelling the vehicle.

BACKGROUND

Hybrid vehicles may include multiple power generating devices that are configured to propel the vehicle.

SUMMARY

A vehicle includes an engine, a motor, and a controller. The engine and motor are each configured to deliver torque to a torque converter impeller. The controller is programmed to, responsive to a demanded impeller torque exceeding an upper motor torque threshold while the motor alone is delivering torque to the impeller, increase motor torque to a value that is less than the threshold and that depends on a torque converter bypass clutch torque capacity and a torque converter turbine speed.

A vehicle includes an engine, a motor, and a controller. The engine is selectively coupled to a torque converter impeller via a disconnect clutch. The motor is fixedly coupled to the impeller. The controller is programmed to, responsive to a demanded impeller torque exceeding a maximum motor torque while the disconnect clutch is open, increase motor torque to a value that is less than the maximum motor torque and that depends on an estimated impeller speed profile.

A vehicle includes an engine, a motor, a torque converter, and a controller. The engine is coupled to the motor via a clutch. The torque converter has an impeller coupled to the motor. The controller is programmed to, responsive to an impeller torque command exceeding a threshold while the clutch is open and the engine is shutdown, increase motor torque to a value that is less than the threshold and that depends on an estimated impeller speed profile.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
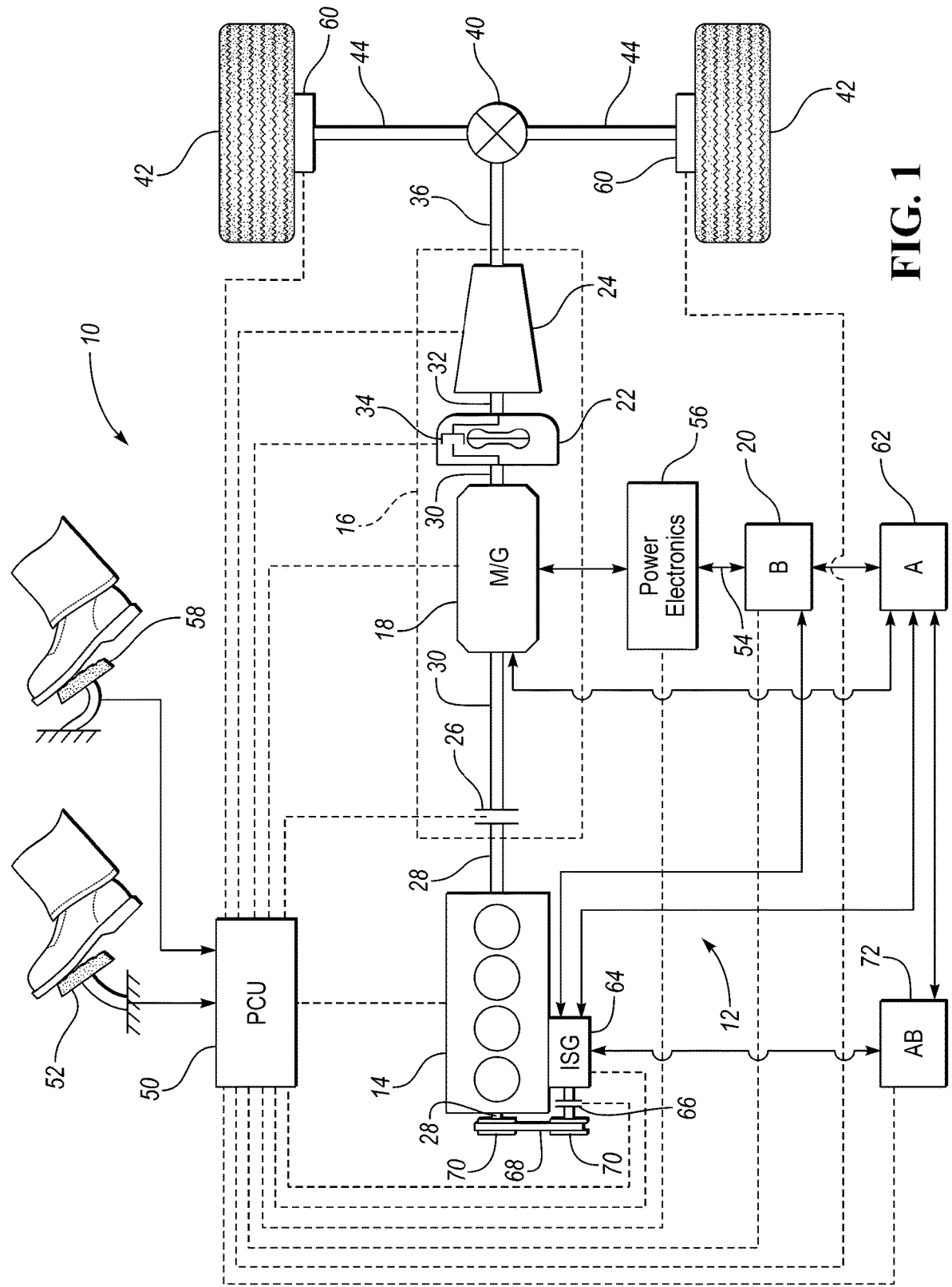
FIG. 1 is a schematic illustration of a representative powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 10 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 10 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine power and/or torque through the disconnect clutch 26 to the M/G 18, and then from the M/G 18 to shaft 30 (i.e., the impeller of the torque converter 22) and through the torque converter 22 and gearbox 24. The M/G 18 may assist the engine 14 by providing additional power and/or torque to turn the shaft 30 (i.e., the impeller of the torque converter 22. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative power and/or torque to the shaft 30 (i.e., the impeller of the torque converter 22. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 10 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

An integrated starter-generator (ISG) 64 may be coupled to the engine 14 (i.e., may be coupled to the crankshaft 28 of the engine 14. The ISG 64 may be configured to operate as a motor to start the engine 14 during an engine start-up event, or to provide additional torque to the powertrain 10 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element.

Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

Figure 2:
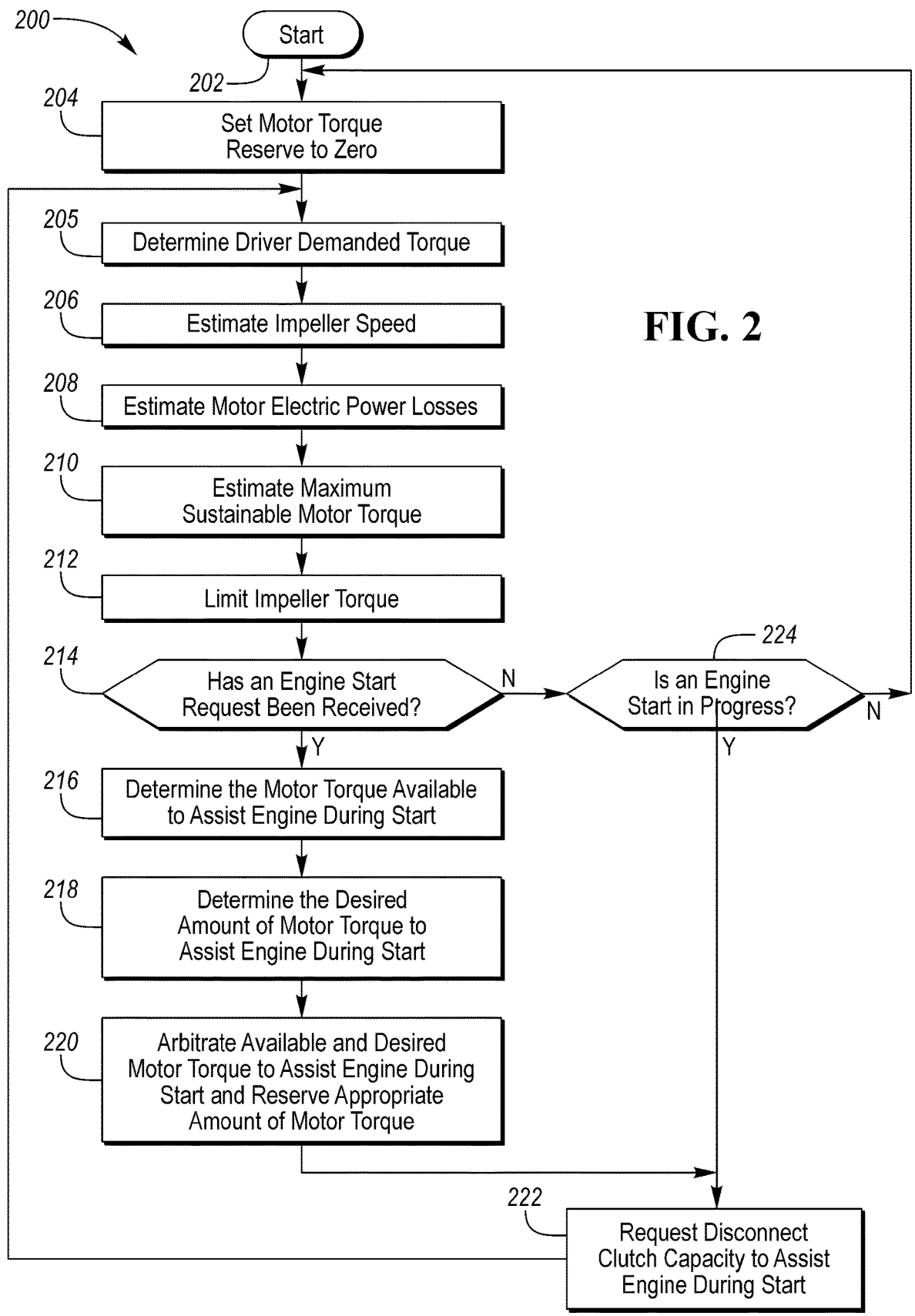
FIG. 2 is a flowchart illustrating a method of adjusting impeller torque.

Referring to FIG. 2, a method 200 of adjusting impeller torque is illustrated. The method 200 may be stored as an algorithm and/or control logic within the controller 50. The controller 50 may be configured to implement the control method 200 based on various conditions of the HEV 10 or various subsystems of the HEV 10. The method 200 is initiated at start block 202. Once the method 200 has been initiated, the method 200 moves on to block 204 where a torque reserve of the M/G 18 is set to zero. The torque reserve of the M/G 18 may refer to an amount of torque that is reserved for starting the engine 14, which may occur by transferring torque from the M/G 18 to engine 14 via closing the disconnect clutch 26.

After setting the torque reserve of the M/G 18 to zero at block 204, the method 200 moves on to block 205 where the driver demanded torque is determined. The driver demanded torque may be determined based on operator input (e.g., a commanded torque via depression of the accelerator pedal 52 and can be specified either in the impeller torque domain, turbine torque domain, or wheel torque domain.

The method 200 next moves on to block 206 where an impeller speed of the torque converter 22 that is required to meet driver demanded torque is estimated. The driver demanded torque may be gradually increased according to a filtering or shaping function, such as an anti-jerk function, so that the powertrain operates in a smooth manner that minimizes noise, vibration, and harshness. If driver demanded torque is specified in the turbine domain, then the impeller speed required to meet driver demanded torque at the turbine may be calculated using equations (1):

$$\tau_{turbine}=K(\omega_i)^2+\tau_{bypass\ clutch} \quad (1)$$

where $\tau_{turbine}$ is driver demanded torque at the turbine of the torque converter 22, $\tau_{bypass}$ is torque capacity of the torque converter bypass clutch 34, $\omega_i$ is the impeller speed of the torque converter 22, and K is the K factor of the torque converter 22, which is a function of turbine speed $\omega_t$ and impeller speed $\omega_i$ of the torque converter 22.

Driver demanded torque specified in the wheel domain can be converted to the driver demanded torque at the turbine, $\tau_{turbine}$ using equation (2):

$$\tau_{turbine} = \frac{\tau_{wheels}}{RT} \quad (2)$$

where RT is the transmission torque ratio and $\tau_{wheels}$ is the driver demanded torque at the wheels 42.

Driver demand torque specified in the turbine domain can be converted to a driver demanded torque at the impeller, and vice versa, using equation (3):

$$\tau_{turbine}=R\tau_{impeller} \quad (3)$$

where R is a torque ratio across the torque converter 22 and $\tau_{impeller}$ is driver demanded torque at the impeller of the torque converter 22. The torque ratio across the torque converter, R, is a function of the impeller speed $\omega_i$ of the torque converter 22 and the turbine speed $\omega_t$ of the torque converter 22.

The desired driver demanded torque at the turbine $\tau_{turbine}$, the torque converter bypass clutch capacity $\tau_{bypass}$, and the turbine speed $\tau_t$ may be known via an operator input (e.g., a commanded torque via depression of an accelerator pedal) or via instrumentation (e.g., torque or speed sensors). Based on the known values of desired driver demanded torque in any domain (e.g., wheel, impeller of torque converter, or turbine of torque converter) the torque converter bypass clutch capacity $\tau_{bypass}$, and the turbine speed $\omega_t$, the controller 50 may estimate the impeller speed $\omega_i$ to meet the driver demanded torque at the turbine $\tau_{turbine}$, utilizing equation (1), and if necessary equations (2) and (3).

Once the estimated impeller speed $\omega_i$ has been determined, the method 200 moves on to block 208 where the electric power losses of the M/G 18 at the estimated impeller speed $\omega_i$ are estimated. The electric power losses of the M/G 18 determined at block 208 may refer to the electrical losses due to inefficiencies of the M/G 18 at the estimated impeller speed $\omega_i$, inefficiencies of the power electrics 56 at the estimated impeller speed $\omega_i$, and/or losses caused by a demanded torque command equal to the sum of the demanded impeller torque $\tau_{impeller}$ and a motor torque reserve.

After determining the electric power losses of the M/G 18 at block 208, the method 200 moves on to block 210 where the maximum sustainable torque of the M/G 18 given the estimated speed of the M/G 18 (which corresponds to the estimated impeller speed $\omega_i$ since the M/G 18 and the impeller are affixed to a common shaft 30), the electric power losses of the M/G 18 determined at block 208, the demanded impeller torque $\tau_{impeller}$, and the power limits of the traction battery 20 (which may include a maximum power output or discharge limit of the traction battery 20, a current charge of the traction battery 20, and a time duration that a specific amount of power output or discharge of the traction battery 20 may be sustained given the current battery charge, etc.). It should be noted that since the maximum sustainable torque of the M/G 18 is dependent on the estimated impeller speed $\omega_i$, the maximum sustainable torque of the M/G 18 will also be dependent on driver demanded torque at the turbine $\tau_{turbine}$, the torque converter bypass clutch capacity $\tau_{bypass}$, and the turbine speed $\omega_t$, according to equation (1) above. It is assumed that the net impeller torque is equal to the demanded impeller torque $\tau_{impeller}$. The difference between the maximum sustainable motor torque and the demanded impeller torque $T_{impeller}$ could be used to compensate for negative torque of the disconnect clutch 26 because net impeller torque will be unchanged.

During a scenario where the engine 14 is being started and the disconnect clutch 26 is being closed while the M/G 18 is operating, the maximum sustainable torque of the M/G 18 determined at block 210 may correspond to a maximum torque value of the M/G 18 that is sustainable during a time period that corresponds to ramping the engine speed up to the impeller speed $\omega_i$ speed during the engine start.

The method 200 next moves on to block 212 where the torque at the impeller is limited. More specifically, the torque at the impeller may be limited to the minimum of (1) the driver demanded torque at the impeller $\tau_{impeller}$ and (2) the sum of the torque of the engine 14 being transferred through the disconnect clutch 26 (if connected) and the maximum sustainable torque of the M/G 18 determined at block 210 minus a torque reserve of the M/G 18. If engine speed is less than impeller speed the torque of the engine 14 being transferred through the disconnect clutch 26 is zero. If engine speed is not less than impeller speed the torque of the engine 14 being transferred through the disconnect clutch 26 is the minimum of capacity of the disconnect clutch 26 and the maximum engine torque. During a scenario where the M/G 18 is powering the HEV 10 alone, a portion of the torque of the M/G 18 (i.e., the torque reserve) may be reserved in the event that the engine 14 may be commanded to start. If the engine 14 is commanded to start, the torque reserve may be transferred from the M/G 18 to the engine 14 by closing the disconnect clutch 26 in order to assist the engine during the starting process. To minimize the time from cranking the engine 14 during a start to connecting the engine 14 to the remainder of the powertrain 10 via the disconnect clutch 26, a finite amount of capacity of the disconnect clutch 26 may be requested before the engine 14 reaches a synchronous speed with the M/G 18. The M/G 18 may compensate for the finite amount of capacity of the disconnect clutch 26 that has been requested provided the capacity is less than a torque reserve.

Also during the scenario where the M/G 18 is powering the HEV 10 alone (i.e., the engine 14 is off and the disconnect clutch 26 is open), if the driver demanded torque at the impeller $\tau_{impeller}$ exceeds an instantaneous maximum torque output potential of the M/G 18 (which may be referred to as an upper threshold, is based on a maximum power output of the traction battery 20, and is greater than the maximum sustainable torque of the M/G 18 determined at block 210, the torque of the M/G 18 may be increased to the maximum sustainable torque of the M/G 18 determined to block 210, if there is a reserve, the maximum sustainable torque of the M/G 18 determined to block 210 minus the reserve. The disconnect clutch 26 may also be commanded to closed in order start and connect the engine 14 to the powertrain 12 in response to the driver demanded torque at the impeller $\tau_{impeller}$) exceeding the instantaneous maximum torque output potential of the M/G 18.

After the impeller torque has been limited at block 212, the method 200 moves on to block 214 it is determined if a request to start the engine 14 has been received. If a request to start the engine 14 has been received the method 200 moves on to block 216, where it is determined how much torque of the M/G 18 is available for assisting the engine 14 during an engine start. The amount of torque of the M/G 18 that is available to assist the engine 14 during the engine start may be equal to or less than the difference between the maximum sustainable torque of the M/G 18 determined at block 210 and the torque that is being currently commanded to the M/G 18 (which is equal to the current demanded torque at the impeller $\tau_{impeller}$). Next, the method 200 moves on to block 218, where it is determined how much torque of the M/G 18 is desired for assisting the engine 14 during an engine start.

After it is determined how much torque of the M/G 18 is available and desired for assisting the engine 14 during an engine start at blocks 216 and 218, respectively, the method 200 moves on to block 220. At block 220 the amount of torque of the M/G 18 that is available and the amount of torque of the M/G 18 that is desired for assisting the engine 14 during the engine start are arbitrated and an appropriate amount of torque of the M/G 18 is reserved for assisting the engine 14 during an engine start. During arbitration, if the amount of available torque of the M/G 18 is less than the desired torque of the M/G 18 for assisting the engine 14 during an engine start, the amount of reserve torque is set to the amount of torque of the M/G 18 that is available for assisting the engine 14 during an engine start. On the other hand, if the if the amount of available torque of the M/G 18 is greater than the desired torque of the M/G 18 for assisting the engine 14 during an engine start, the amount of reserve torque is set to the amount of torque of the M/G 18 that is desired for assisting the engine 14 during an engine start.

Once the arbitration step at block 220 is complete, the method 200 moves on to block 222 where a desired or requested torque capacity of the disconnect clutch 26 during an engine start is generated. If the desired or requested disconnect clutch 26 capacity is less than the available torque of the M/G 18 for assisting the engine 14 during an engine start (determined at block 216), then the motor torque reserve can be set to the desired or requested torque capacity of the disconnect clutch 26. If the desired or requested disconnect clutch 26 capacity is greater than the available torque of the M/G 18 for assisting the engine 14 during an engine start, then the disconnect clutch 26 capacity is clipped to the available torque of the M/G 18 to prevent the impeller torque from dropping. Once the desired or requested torque capacity of the disconnect clutch 26 during an engine start is generated, the method 200 returns to the input of block 205.

Returning to block 214, if a request to start the engine 14 has not been received the method 200 moves on to block 224, where it is determined if an engine start is in progress. If an engine start is in progress, the method 200 moves on directly to block 222. On the other hand, if an engine start is not in progress, the method 200 returns to the input of block 204. It should be understood that the flowchart in FIG. 2 is for illustrative purposes only and that the method 200 should not be construed as limited to the flowchart in FIG. 2. Some of the steps of the method 200 may be rearranged while others may be omitted entirely.

Figure 3:
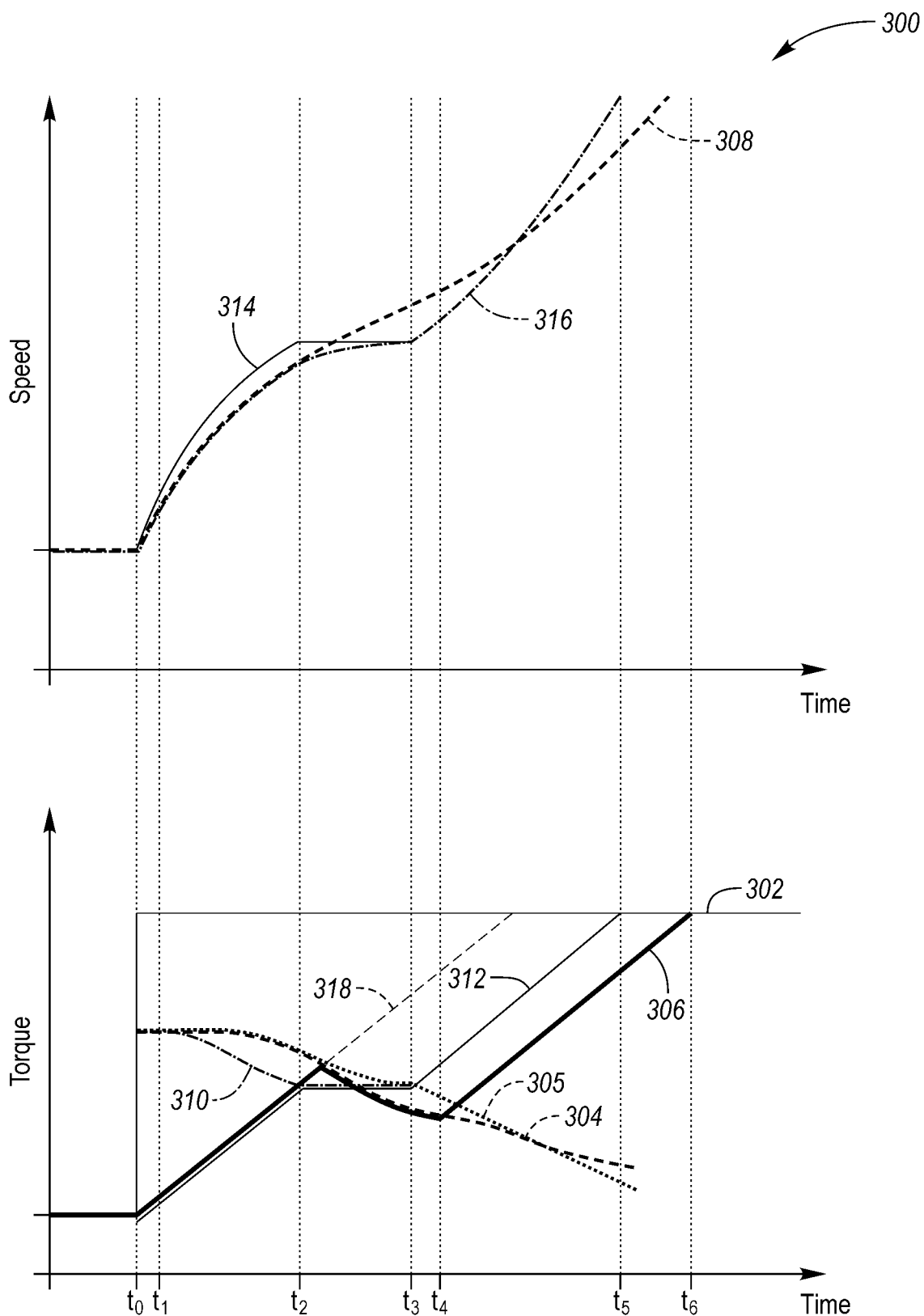
FIG. 3 is a graph illustrating impeller speed and impeller torque during an engine start.

Referring to FIG. 3 a graph 300 of impeller speed and impeller torque during an engine start is illustrated. The engine start may correspond to a tip-in of the accelerator pedal 52. Line 302 corresponds to an unfiltered or unshaped driver demanded impeller torque. Line 304 corresponds to the instantaneous maximum torque output potential of the M/G 18 that may be delivered to the impeller when the torque of the M/G 18 is not limited according to the maximum sustainable torque of the M/G 18. Line 305 corresponds to the instantaneous maximum torque output potential of the M/G 18 that may be delivered to the impeller when the torque of the M/G 18 is limited according to the maximum sustainable torque of the M/G 18. Line 306 corresponds to the torque delivered to the impeller when the torque of the M/G 18 is commanded according to the instantaneous maximum torque output potential of the M/G 18. Line 308 corresponds to the impeller speed response when the torque of the M/G 18 is commanded according to the instantaneous maximum torque output potential of the M/G 18. Line 310 corresponds to a maximum sustainable torque of the M/G 18 during the time period that corresponds to ramping the engine speed up to the estimated impeller speed $\omega_i$ (see block 210). Line 312 corresponds to the torque delivered to the impeller when the torque of the M/G 18 is commanded according to the estimated the driver demanded torque at the impeller $\tau_{impeller}$ (see block 206) and has been limited to the maximum sustainable torque of the M/G 18 during the engine start. Line 314 is the estimated impeller speed $\omega_i$ (see block 206). Line 316 corresponds to the impeller speed response when the torque of the M/G 18 is limited to the maximum sustainable torque of the M/G 18 (see block 210). Line 318 illustrates a filtered or shaped torque profile in the event that the engine 14 had already been delivering torque to the impeller.

At time $t_0$, the vehicle operator increases torque demand 302 to a value that exceeds the maximum torque output of the M/G 18, which results in the initiation of an engine start at time $t_1$. When the torque is delivered to the impeller according to line 312 (where the torque of the M/G 18 is commanded according to the demanded torque at the impeller $\tau_{impeller}$, after filtering or shaping and is limited to the maximum sustainable torque of the M/G 18 during the time period that corresponds to ramping the engine speed up to the estimated impeller speed $\omega_i$), the engine 14 begins to deliver torque to the impeller at time $t_3$ resulting in the demanded impeller torque 302 being obtained at time $t_5$ (prior to time $t_3$ along line 312 only the M/G 18 is delivering torque to the impeller). When the torque is delivered to the impeller according to line 306 (where the torque of the M/G 18 is commanded according to the instantaneous maximum torque output potential of the M/G 18, the engine 14 begins to deliver torque to the impeller at time $t_4$ resulting in the demanded impeller torque 302 being obtained at time $t_6$ (prior to time $t_4$ along line 306 only the M/G 18 is delivering torque to the impeller). Therefore, commanding the torque of the M/G 18 according to the estimated driver demanded torque at the impeller $\tau_{impeller}$ and limiting the torque of the M/G 18 to the maximum sustainable torque of the M/G 18, results the engine 14 starting and obtaining the demanded impeller torque 302 at an earlier time when compared to commanding the torque of the M/G 18 according to the instantaneous maximum torque output potential of the M/G 18.

Figure 4:
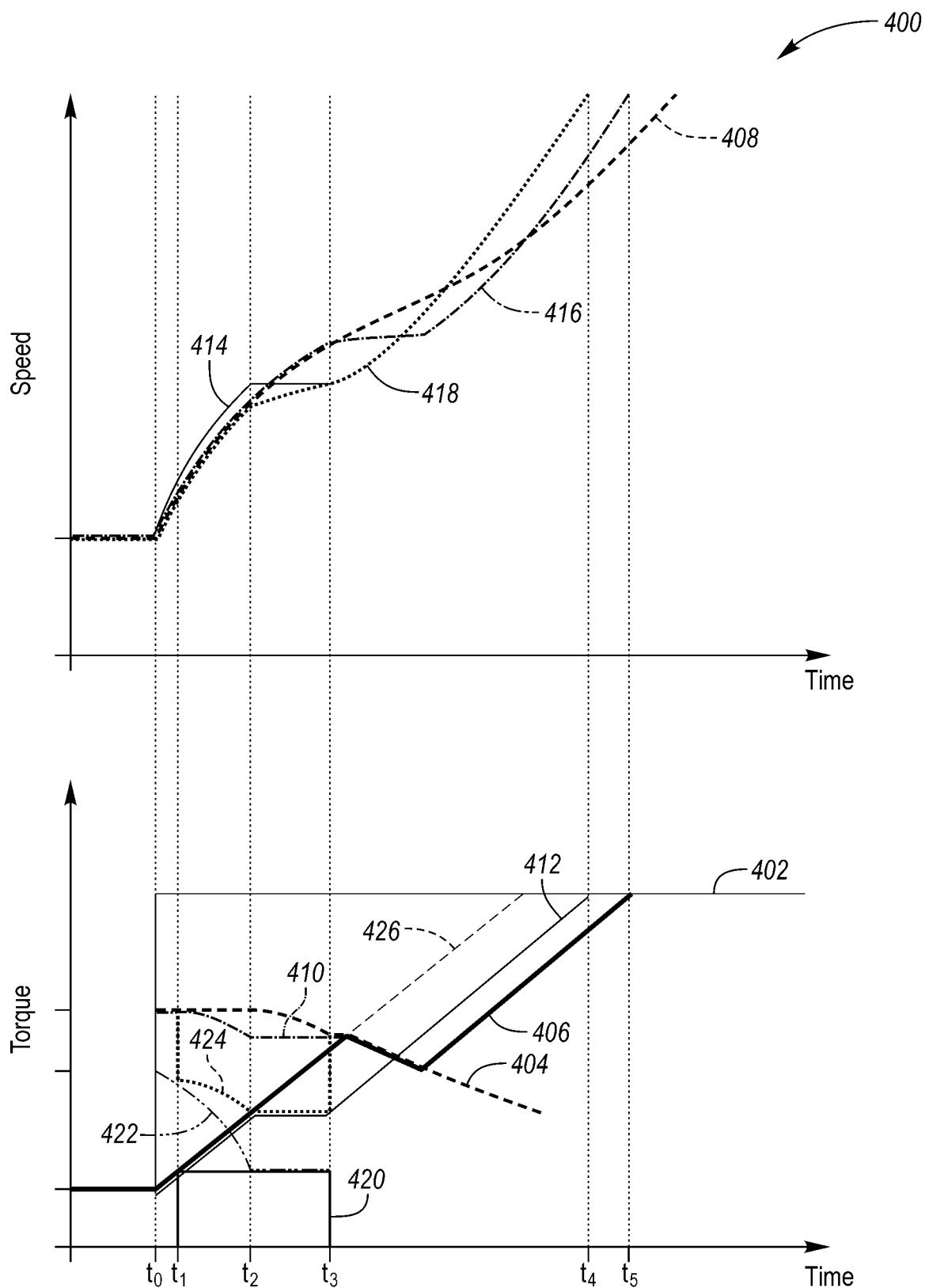
FIG. 4 is a graph illustrating impeller speed, impeller torque, and other various parameter during an engine start that utilizes a motor/generator to start the engine.

Referring to FIG. 4, a graph 400 of impeller speed, impeller torque, and other various parameters during an engine start that utilizes the M/G 18 to start the engine 14 is illustrated. The engine start may correspond to a tip-in of the accelerator pedal 52. Line 402 corresponds to the unfiltered or unshaped driver demanded impeller torque. Line 404 corresponds to the instantaneous maximum torque output potential of the M/G 18 that may be delivered to the to the impeller. Line 406 corresponds to the torque delivered to the impeller via the M/G 18 when the torque of the M/G 18 is commanded according to the maximum sustainable torque of the M/G 18 when no M/G 18 torque is reserved to assist during the engine run-up. Line 408 corresponds to the impeller speed response when the torque of the M/G 18 is commanded according to the instantaneous maximum torque output potential of the M/G 18. Line 410 corresponds a maximum sustainable torque of the M/G 18 during the time period that corresponds to ramping the engine speed up to the estimated impeller speed $\omega_i$ (see block 210). Line 412 corresponds to the torque delivered to the impeller when the disconnect clutch 26 is used to assist in engine run-up and the M/G 18 torque delivered to the impeller torque is limited to the maximum sustainable torque of the M/G 18 minus a torque reserve required to start the engine 14. Line 414 is the estimated impeller speed $\omega_i$ (see block 206) when there is a torque reserve to assist run-up of the engine 14. Line 416 corresponds to the impeller speed response when the torque of the M/G 18 is limited to the maximum sustainable torque of the M/G 18 (see block 210) when there is no torque reserve to assist run-up of the engine 14. Line 418 corresponds to the impeller speed response when the torque of the M/G 18 is limited to the maximum sustainable torque of the M/G 18 when torque from the disconnect clutch 26 is used to assist run-up of the engine 14. Line 420 is a M/G 18 torque reserved to assist run-up of the engine 14. Line 422 is a maximum torque of the M/G 18 that may be reserved for run-up of the engine 14. Line 424 is a maximum torque of the M/G 18 that may be delivered to the impeller when there is a torque reserved for assisting run-up of the engine 14, which is difference between the maximum sustainable torque of the M/G 18 shown in line 410 and the torque reserve 420. Line 426 illustrates a torque profile in the event that the engine 14 had already been delivering torque to the impeller.

FIG. 4 follows the same pattern as in FIG. 3 with the exception that the torque of the M/G 18 is limited to the adjusted maximum sustainable torque of the M/G 18 of line 424 as opposed to the maximum sustainable torque of the M/G 18 of line 410 during the engine start between time $t_1$ and $t_3$, allowing the reserve torque 420 to be utilized to start the engine 14.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
an engine and a motor each configured to deliver torque to a torque converter impeller; and
a controller programmed to, responsive to a demanded impeller torque exceeding an upper motor torque threshold while the motor alone is delivering torque to the impeller, increase motor torque to a value that is less than the threshold, wherein the value is based on a torque converter bypass clutch torque capacity and a torque converter turbine speed.

2. The vehicle of claim 1 further comprising a battery configured to power the motor, wherein the value is further based on a battery discharge limit.

3. The vehicle of claim 2 further comprising a disconnect clutch configured to selectively couple the engine to the impeller, wherein the controller is programmed to, responsive to the demanded impeller torque exceeding the threshold while the motor alone is delivering torque to the impeller, close the disconnect clutch and start the engine.

4. The vehicle of claim 3, wherein the value corresponds to a motor torque value that is sustainable during a time period corresponding to ramping the engine to an estimated impeller speed during the engine start.

5. The vehicle of claim 3, wherein a portion of the motor torque is transferred through the disconnect clutch to assist starting the engine.

6. The vehicle of claim 5, wherein the portion of the motor torque transferred through the disconnect clutch is less than or equal to a difference between the value and a current motor torque.

7. The vehicle of claim 1, wherein the value is further based on a demanded torque converter turbine torque.

8. A vehicle comprising:
an engine selectively coupled to a torque converter impeller via a disconnect clutch;
a motor fixedly coupled to the impeller;
a torque converter bypass clutch; and
a controller programmed to, responsive to a demanded impeller torque exceeding a maximum sustainable motor torque while the disconnect clutch is open, increase motor torque to a value that is less than the maximum sustainable motor torque, wherein the value is based on an estimated impeller speed profile, and wherein the estimated impeller speed profile is based on a torque capacity of the bypass clutch, a torque converter turbine speed, and a demanded torque converter turbine torque.

9. The vehicle of claim 8 further comprising a battery configured to power the motor, wherein the value is further based on a battery discharge limit.

10. The vehicle of claim 9, wherein the controller is programmed to, responsive to the demanded impeller torque exceeding the maximum sustainable motor torque while the disconnect clutch is open, close the disconnect clutch and start the engine.

11. The vehicle of claim 10, wherein the value corresponds to a motor torque value that is sustainable during a time period corresponding to ramping the engine to the estimated impeller speed during the engine start.

12. The vehicle of claim 10, wherein a portion of the motor torque is transferred through the disconnect clutch to start the engine.

13. The vehicle of claim 12, wherein the portion of the motor torque transferred through the disconnect clutch is less than or equal to a difference between the value and a current motor torque.

14. A vehicle comprising:
an engine coupled to a motor via a clutch;
a torque converter having an impeller coupled to the motor;
a torque converter bypass clutch; and
a controller programmed to, responsive to an impeller torque command exceeding a threshold while the clutch is open and the engine is shutdown, increase motor torque to a value that is less than the threshold, wherein the value is based on an estimated impeller speed profile, and wherein the estimated impeller speed profile is based on a torque capacity of the bypass clutch, a torque converter turbine speed, and a demanded torque converter turbine torque.

15. The vehicle of claim 14 further comprising a battery configured to power the motor, wherein the value is further based on a battery discharge limit.

16. The vehicle of claim 15, wherein the controller is programmed to, responsive to the impeller torque command exceeding the threshold while the clutch is open and the engine is shutdown, close the clutch and start the engine.

17. The vehicle of claim 16, wherein the value corresponds to a motor torque value that is sustainable during a time period corresponding to ramping the engine to the estimated impeller speed during the engine start.

18. The vehicle of claim 16, wherein a portion of the motor torque is transferred through the clutch to assist starting the engine.

19. The vehicle of claim 18, wherein the portion of the motor torque is less than or equal to a difference between the threshold and a current motor torque.

* * * * *